Aug. 26, 1969   R. A. EUCKER   3,463,870
SPACER/DAMPER
Filed Feb. 14, 1968
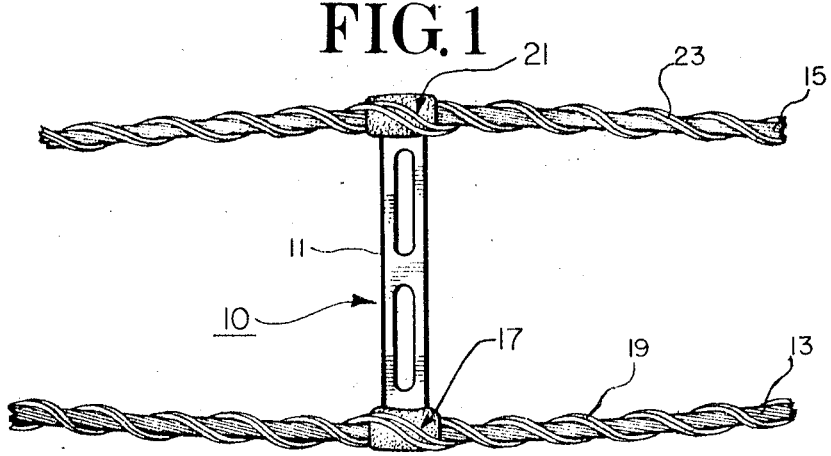
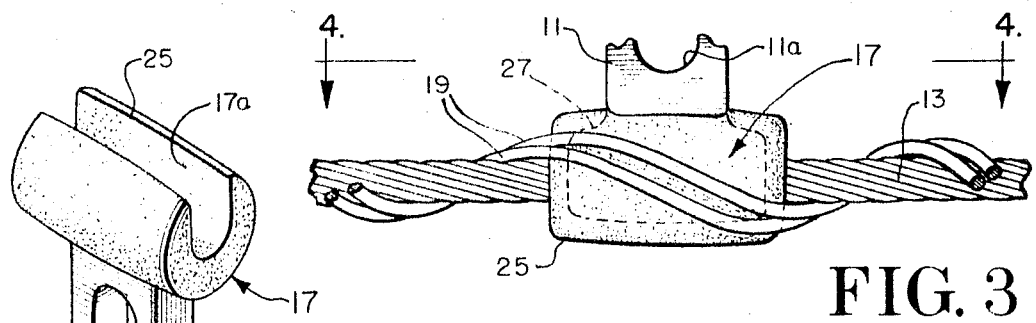
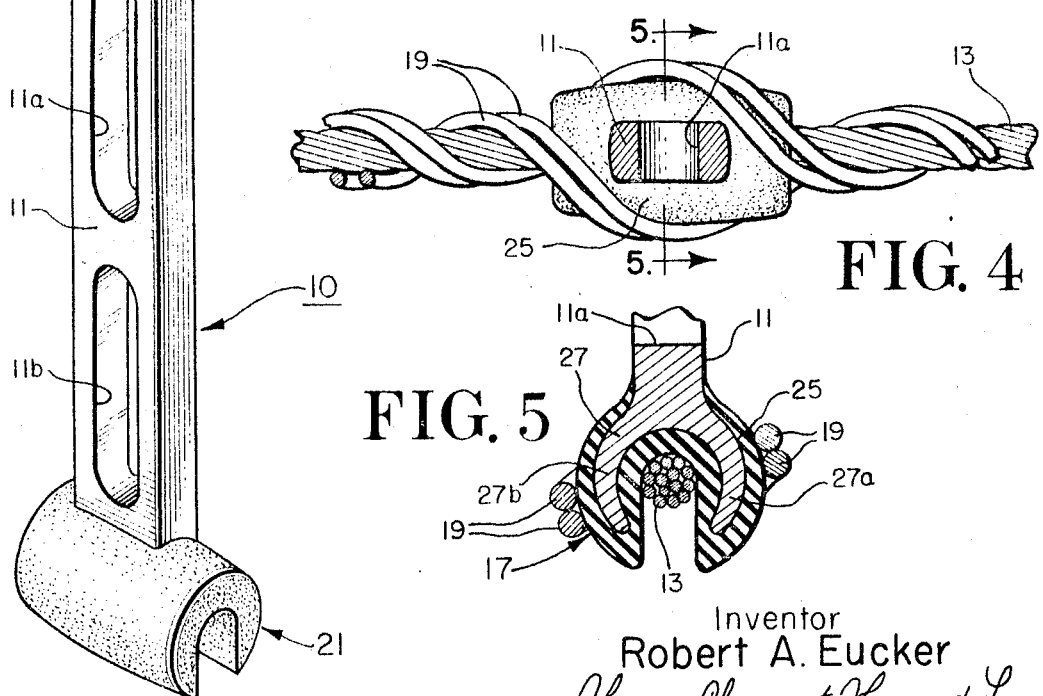
Inventor
Robert A. Eucker
By *Hume, Clement, Hume & Lee*
Attorneys

United States Patent Office 3,463,870
Patented Aug. 26, 1969

3,463,870
SPACER/DAMPER
Robert A. Eucker, Brooklyn, Ohio, assignor to Preformed Line Products Company, Cleveland, Ohio, a corporation of Ohio
Filed Feb. 14, 1968, Ser. No. 705,374
Int. Cl. H02g 7/12, 7/14
U.S. Cl. 174—42   8 Claims

ABSTRACT OF THE DISCLOSURE

A device is disclosed for maintaining a desired spacing between a pair of electrical transmission cables or the like. A rigid spacer bar preferably includes opposed, integral U-shaped end portions for receiving respective ones of the cables intermediate the opposed legs of each end portion. A rubber-like cushion is interposed between the cables and the respective spacer end portions to resiliently support each cable and damp excessive movement thereof. The cables and the respective spacer end portions are held in a closely adjacent relationship by retaining means, preferably a series of helically preformed elements interwound about each cable and its associated spacer end portion.

Introduction

The present invention relates generally to the suspension of electrical transmission lines or the like and, more specifically, is directed to a device for maintaining a predetermined spacing between a suspended line and an adjacent body, such as a second suspended line.

Summary of the invention

It is a primary object of the present invention to provide a new and improved spacer device for suspended cables which device damps vibratory motion of the cables.

It is a further object of the present invention to provide a spacer assembly having a predetermined cushioning and damping influence on the motion components of the suspended lines thereby to alleviate or preclude vibration transfer between the cables, torsional oscillations, excessive swaying of the lines and sharp impact between the lines and the rigid structural components of the spacer assembly such as are apt to cause mutual damage to these members.

It is another object of the present invention to provide a desired spacing between suspended lines while precluding abrasion or fatigue damage to both the suspended lines and the spacer assembly.

It is yet another object of the invention to provide a spacer assembly of exceptional strength and ruggedness that is not likely to incur permanent damage or deformation even under extreme environmental conditions.

It is a more specific object of the present invention to provide a spacer assembly adapted to maintain a desired line spacing while also resiliently damping longitudinal and rotational movement of the suspended lines relative to the spacer assembly to thereby preclude excessive torquing or binding of the lines and spacer assembly with resultant damage thereto.

Accordingly, the present invention is directed to a device for maintaining a predetermined spacing between a pair of electrical transmission cables or the like. Specifically, there is provided a rigid spacer means including a rigid elongated spacing arm having a predetermined longitudinal axis and first and second integral end portions. The end portions are each of a generally U-shaped configuration integrally affixed to said rigid spacing arm at the bight of said U and with the open side of said U-shaped end portion facing in a direction generally transverse to the longitudinal axis of the spacing arm, the spacer means being adapted for receiving respective ones of the cables intermediate the opposed legs of the U-shaped first and second end portions. A rubber-like cushion means is intimately molded about the first and second end portions of the spacer means to provide an integral and permanent covering for buffering impact between the spacer end portions and the cables and for damping movement of the cables. Helically preformed rod means adapted to be wrapped about each of said first and second end portions and to extend in encircling relation along said cables in opposite directions from said first and second end portions provided for maintaining the cables and the first and second end portions of the spacer means in assembled relationship.

Brief description of the drawings

The features of the present invention which are believed to be novel are set forth with particularity in the appended claims. The invention together with future objects and advantages thereof may best be understood, however, with reference to the following description taken in connection with the accompanying drawings in the several figures of which like reference numerals identify like elements and in which:

FIGURE 1 is a plan view of a preferred embodiment of the invention as applied between a pair of suspended electrical transmission cables;

FIGURE 2 is an enlarged perspective view of the spacer device illustrated in FIGURE 1 but absent the retaining means;

FIGURE 3 is a fragmentary plan view of one end portion of the spacer assembly as it is being installed on a suspended line;

FIGURE 4 is a cross-sectional view taken along lines 4—4 of FIGURE 3 and showing the completed installation;

FIGURE 5 is a sectional view taken along lines 5—5 of FIGURE 4 and again showing the assembly as completely installed on the cable.

Description of the preferred embodiment

Referring now to FIGURE 1, there is shown a spacer assembly 10 according to the present invention and including an elongated spacing arm 11 for maintaining a predetermined minimum separation between a suspended line 13 and an adjacent body, here a second suspended line 15. The suspended lines 13 and 15 herein illustrated are the so-called bundled conductors used in the transmission of electrical power and, in this regard, it will be understood that lines 13 and 15 may be at a like or differing electrical potential consistent with the principles of the present invention.

The spacing arm 11 includes a first end assembly 17, for at least partially surrounding the cable 13. As will presently be explained, the end assembly 17 of the preferred embodiment herein disclosed includes a U-shaped rigid metal member integral with the spacing arm 11 about which there is provided a molded cushion means of neoprene or the like. The first end assembly 17 and the cable 13 are maintained in a predetermined adjacent relationship by an appropriate retaining means 19. The retaining means 19 includes at least one and preferably a plurality of conventional helically preformed elements intertwined about the cable and the first end assembly 17 of the spacer device. The spacer device 10 also includes an identical second end assembly 21, for receiving and retaining the line 15. The second end assembly 21 and the cable 15 are similarly retained in closely adjacent relationship by a plurality of helical elements 23 interwound about the members. Although only a spacer for a pair of cables is illustrated, it will presently become apparent to those skilled in the art that the invention is of equal utility in spacer assemblies for various other groupings and numbers of cables.

Referring now to FIGURE 2, the construction of the device 10 may be considered in further detail. Specifically, the elongated spacing arm 11 is composed of aluminum or other generally rigid material and is of an elongated rectangular outline with two axially spaced central apertures 11a and 11b provided to effect a reduction in weight of the bar 11 wihout substantially impairing its structural integrity. Alternatively, the spacing bar may be of a hollow tubular construction. At any rate, the spacing bar 11 is formed to have two opposed and identical end assemblies 17 and 21. The end assembly 17 comprises a cushion means 25 of substantial thickness adapted for interposition between a first rigid, generally U-shaped end portion of the spacer (not visible in the figure because of the presence of the cushion 25) and a cable. More specifically, the rubber-like cushion 25 entirely surrounds or overlies the U-shaped end portion of the spacer and preferably, is intimately molded thereabout or otherwise fixedly attached to the spacer end portion to form a composite, permanent structure. The permanent embedding of the end portion of the spacer arm in the cushion 25 reduces the number of distinct components in the assembly and thereby simplifies the lineman's task of installing the spacer device. Of course, the opposed end assembly 21 of the spacer device may be of identical construction to that of the end assembly 17.

The cushion 25 of the end assembly 17 is molded to define a cable receiving recess or slot 17a intermediate the opposed rigid legs of the end portion of the spacer. Preferably, the recess 17a has a longitudinal orientation which is transverse to the longitudinal axis of the spacing arm 11 and, in addition, the elongated opening of the recess 17a faces a direction generally parallel to the axis of the spacing arm 11, as shown in the drawing. This recess orientation relative to the spacing arm assures that transverse impulse forces applied to the spacer device 10 by swaying and the like of the suspended lines will be transmitted directly along the axis of the spacing bar 11, rather than at some oblique angle, thereby reducing the probability of fatigue damage to the spacer device.

The method of installing the spacer device on one of the cables 13 as well as the preferred thickness and surface contour of the molded cushion 25 are shown most clearly in FIGURES 3–5. In FIGURE 3, the cable 13 has been inserted into the U-shaped cable receiving recess 17a and is positioned at the base of the slot with the first pair of the helically preformed elements of the retaining means 19 interwound about the cable and the end assembly 17 of the spacer device to maintain these members in the desired adjacent relationship. As shown, the helical elements are of like pitch and are interwound so as to be contiguous along their full lengths. The helically preformed elements 19 are of a type well known to the art and, of course, for the present application should have a nominal internal diameter somewhat smaller than the outer diameter of the cable to insure a reasonably firm engagement therebetween. It has been found that the helical rods 19 have a tendency to rotate or roll about the cable as they are being applied about the cable and spacer end assembly thereby making it somewhat tedious for a lineman to install the helical rods in the illustrated and preferred alignment and gripping relation with the cushion 25. For this reason, it is in some instances desirable to form the cushion so that an integral guide or locating means projects from the surface contour of the cushion to positively index or position the helical armor rods thereon. For example, three truncated cylindrical neoprene nubs or posts may be integrally formed with the neoprene cushion on the top surface thereof as viewed in FIGURE 3 with the posts being in line with the axis of the spacing bar 11 and spaced one from another by the diameter of a helical rod 19. Thus, each helical rod would be positioned between a respective pair of the locating nubs. Alternatively, the positioning means may take the form of integrally molded ridges traversing the cushion 25 along the desired path for the helical rods 19.

At any rate, the nubs or other indexing means have served their function once the helical rods 19 are properly installed and it is presently contemplated that the nubs will eventually fatigue and sever from the cushion as a consequence of the effects of the normally encountered vibration and twisting of the spacer assembly.

The outer surface of the cushion 25 is preferably of the illustrated ellipsodial contour so as to provide a somewhat gradual transition between the longitudinal ends of the cushion and the narrower diameter cable 13. The integral U-shaped end portion 27 of the spacer bar 11 is visible in phantom outline in FIGURE 3, and, as shown, the molded cushion means 25 extends very substantially beyond the longitudinal limits of the U-shaped end member 27. It has been found that such an arrangement provides a resilient support and motion damping influence on the more remote portions of the cable without an attendant large torque on the rigid elements of the spacer device. Furthermore, the resilient cushions are sufficiently flexible to permit a limited and resiliently damped relative longitudinal movement of the cable. The resilient cushions also damp the relatively high frequency, low amplitude vibrations of a cable experienced under certain wind conditions and prevent translation of such vibrations to an adjacent cable. Additionally, torsional oscillations, i.e., relative rotational movement between the spacer end portion and the cables are damped by the described construction while damage to the cable from abrasion, etc. is effectively obviated.

Referring to FIGURE 4, a second pair of helical elements 19 have been applied about the cable in approximate phase opposition to the corresponding helical elements of the first pair thereby to complete the end assembly 17 and suitably confine the cable 13 to the slotted recess 17a; the helical elements 19 are seen quite clearly in cross-section in FIGURE 5. In certain circumstances, a singular helical element or various desired arrangements of a series of helical elements other than that illustrated may afford satisfactory retention although the disclosed arrangement is presently preferred. Again, it may be desirable to provide an integral positioning means identical to that earlier described on the opposite side of the cushion 25 to assure that this second set of helical rods is properly aligned with the cushion and particularly is in the illustrated and preferred phase opposition relation to the first set of helical rods.

The recess 17a of the spacer end portion is of a U-shaped cross-section with the distance between the opposed side walls of the recess being approximately equal to the outer diameter of the cable 13. The recess 17a is also preferably somewhat deeper than the cable diameter to permit limited movement of the cable along a direction parallel to the axis of the spacing arm 11. It has been found that the provision of a slotted recess of such a dimension as to easily accommodate the suspended line allows for sufficient relative movement between the spacer arm and cable, both in a longitudinal and rotational direction, so that excessive twisting or torsional forces between the members, resulting in fatigue damage, etc. to either or both of them, are effectively avoided. The molded cushion 25, in addition to absorbing impact forces from the cable 13 and damping excessive motion thereof, also prevents abrasion or fatigue damage to the spacer end portion 27, the cable 13 and the surrounding helical elements 19. In summary, the spacer assembly is of exceptional strength and ruggedness so that it is unlikely to be damaged under even severe environmental conditions caused by high winds, icing or an electrical fault in the cables or the load termination which fault may result in the cables being drawn together or apart with great force.

From FIGURE 4, the cross-sectional outline of the integral U-shaped end portion 27 of the spacing bar 11 is also clearly visible. The end portion 27 includes a pair of leg members 27a and 27b adapted to partially enclose the cable 13 and to this end the terminal extent of each leg portion is directed toward the other in a pincer-like configuration. The rigid metal provides an excellent support base for the integrally molded cushions.

I claim:

1. A device for maintaining a predetermined minimum spacing between a plurality of electrical transmission cables or the like which cables are subject to extended swaying movement by virtue of environmental condition, said device comprising:

rigid spacer means, including a rigid, elongated spacing arm having a predetermined longitudinal axis and first and second rigid end portions each of a generally U-shaped configuration integrally affixed to said rigid spacing arm at the bight of said U and with the open side of said U-shaped end portion facing in a direction generally transverse to said predetermined axis, said spacer means receiving respective ones of said cables intermediate the opposed legs of said U-shaped first and second end portions;

rubber-like cushion means intimately molded about said first and second spacer end portions to provide an integral and permanent covering for buffering impact between said spacer end portions and said cables and for damping movement of said cables;

and helically preformed rod means wrapped about each of said first and second end portions and extending in encircling relation along said cables in opposite directions from said first and second end portions for maintaining said spacer means in assembled relation with said cables and for permitting only a predetermined limited movement between said first and second end portions of said spacer means and said cables.

2. The device of claim 1 in which said first end portion of said spacer means, said cushion means and said helically preformed rod means are constructed and arranged for resiliently damping relative rotational movement between said spacer arm and said cable.

3. The device of claim 2 in which said spacer means, said cushion means and said helically preformed rod means are constructed and arranged for resiliently damping relative longitudinal, vertical, elliptical and horizontal vibratory motion between said plurality of transmission cables.

4. The device of claim 3 in which each of said first and second end portions of said spacer means is dimensioned to extend longitudinally along respective ones of said cables a distance substantially in excess of the diameter of said cables.

5. The device of claim 4 in which said cushion means is molded to define similar U-shaped cable receiving recesses intermediate said opposed legs of said U-shaped first and second end portions of said spacer means, the distance between the opposed sidewalls of said U-shaped recesses being substantially equal to the diameter of said cables.

6. The device of claim 5 in which said cushion means extends at both of its ends beyond the maximum longitudinal dimension of each of said first and second spacer end portions for providing extended resilient support for said cables.

7. The device of claim 6 in which said cushion means is of an ellipsoidal outer contour.

8. The device of claim 7 in which said U-shaped cable receiving recess opens transversely to the axis of said cable and substantially parallel to the axis of said elongated spacer arm.

References Cited

UNITED STATES PATENTS

| | | | |
|---|---|---|---|
| 550,532 | 11/1895 | Rozell | 256—36 |
| 705,073 | 7/1902 | Grover | 174—146 X |
| 803,973 | 11/1905 | Bemis | 174—155 |
| 1,078,711 | 11/1913 | Whitehead. | |
| 2,915,580 | 12/1959 | Gill et al. | 174—146 X |
| 2,918,520 | 12/1959 | Stevens | 174—146 |
| 2,959,632 | 11/1960 | Peterson | 174—146 X |
| 3,076,865 | 2/1963 | Volk et al. | 174—146 |
| 3,113,994 | 12/1963 | Hammel et al. | 174—146 X |
| 3,161,721 | 12/1964 | Torr | 174—146 X |

FOREIGN PATENTS

| | | |
|---|---|---|
| 914,859 | 1/1963 | Great Britain. |
| 1,246,530 | 10/1960 | France. |

LARAMIE E. ASKIN, Primary Examiner

U.S. Cl. X.R.

24—262; 174—146, 173